United States Patent
Chiyo et al.

(10) Patent No.: US 9,883,055 B2
(45) Date of Patent: Jan. 30, 2018

(54) IMAGE FORMING APPARATUS, IMAGE FORMING METHOD, AND COMPUTER-READABLE RECORDING MEDIUM THAT RECEIVE A PROCESS REQUEST FOR PERFORMING A PREDETERMINED PROCESS FROM AN APPARATUS

(71) Applicants: Naoki Chiyo, Kanagawa (JP); Teruaki Takahashi, Kanagawa (JP)

(72) Inventors: Naoki Chiyo, Kanagawa (JP); Teruaki Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/436,127

(22) Filed: Feb. 17, 2017

(65) Prior Publication Data

US 2017/0163824 A1    Jun. 8, 2017

Related U.S. Application Data

(63) Continuation of application No. 14/594,669, filed on Jan. 12, 2015, now Pat. No. 9,614,982.

(30) Foreign Application Priority Data

Jan. 29, 2014  (JP) ................................ 2014-014820

(51) Int. Cl.
*G06F 15/00* (2006.01)
*H04N 1/00* (2006.01)

(52) U.S. Cl.
CPC ..... *H04N 1/00281* (2013.01); *H04N 1/00204* (2013.01); *H04N 2201/0094* (2013.01)

(58) Field of Classification Search
CPC .......... H04N 1/00281; H04N 1/00204; H04N 2201/0094
USPC ........................................................ 358/1.15
See application file for complete search history.

(56) References Cited

U.S. PATENT DOCUMENTS

| | | |
|---|---|---|
| 2005/0183141 A1 | 8/2005 | Sawada |
| 2008/0291489 A1 | 11/2008 | Takahashi |
| 2009/0002770 A1 | 1/2009 | Cavill |
| 2009/0033972 A1 | 2/2009 | Kato |

(Continued)

FOREIGN PATENT DOCUMENTS

| | | |
|---|---|---|
| JP | 11-119951 | 4/1999 |
| JP | 2000-125071 | 4/2000 |

(Continued)

*Primary Examiner* — Saeid Ebrahimi Dehkordy
(74) *Attorney, Agent, or Firm* — Oblon, McClelland, Maier & Neustadt, L.L.P.

(57) ABSTRACT

A system according to the present invention includes a first communication unit, a second communication unit, and an executing unit. The first communication unit is connected to a first network segment. The second communication unit is connected to a second network segment different from the first network segment, and receives a processing request, which requests to execute predetermined processing, from an apparatus via the second network segment and transmits the received processing request to the first communication unit. The executing unit executes the predetermined processing in response to the processing request received by the first communication unit.

10 Claims, 5 Drawing Sheets

(56) References Cited

U.S. PATENT DOCUMENTS

| | | |
|---|---|---|
| 2009/0036056 A1 | 2/2009 | Oshima et al. |
| 2009/0052348 A1 | 2/2009 | Kato et al. |
| 2009/0066998 A1 | 3/2009 | Kato |
| 2010/0118328 A1 | 5/2010 | Sakuraba |
| 2010/0123927 A1 | 5/2010 | Hirose |
| 2010/0214586 A1* | 8/2010 | Suzuki .................. G06F 9/441 358/1.13 |
| 2011/0292445 A1 | 12/2011 | Kato |
| 2012/0140263 A1 | 6/2012 | Oba |
| 2012/0206751 A1 | 8/2012 | Bradshaw |

FOREIGN PATENT DOCUMENTS

| | | |
|---|---|---|
| JP | 2005-045308 | 2/2005 |
| JP | 2010-093430 | 4/2010 |
| JP | 2012-119995 | 6/2012 |

* cited by examiner

IMAGE FORMING APPARATUS, IMAGE FORMING METHOD, AND COMPUTER-READABLE RECORDING MEDIUM THAT RECEIVE A PROCESS REQUEST FOR PERFORMING A PREDETERMINED PROCESS FROM AN APPARATUS

CROSS-REFERENCE TO RELATED APPLICATIONS

This application is a continuation of U.S. patent application Ser. No. 14/594,669, filed on Jan. 12, 2015, and is based upon and claims the benefit of priority from Japanese Patent Application No. 2014-014820, filed in Japan on Jan. 29, 2014. The entire contents of each of above applications are incorporated herein by reference.

BACKGROUND OF THE INVENTION

1. Field of the Invention

The present invention relates to an information processing system, an information processing method, and a computer-readable recording medium.

2. Description of the Related Art

Conventionally, there is known a configuration of network equipment, such as an image forming apparatus, which has a means for connecting to a wired local area network (LAN) and a means for establishing a wireless connection to another apparatus through the use of Wi-Fi, etc. and is capable of concurrently communicating with an apparatus (for example, a smart device) to be connected wirelessly through the use of Wi-Fi, etc.

For example, Japanese Patent Application Laid-open No. 2005-045308 has disclosed a configuration for establishing a wireless connection between an image processing apparatus and a mobile terminal device for the purpose of operating the image processing apparatus from the mobile terminal device. The image processing apparatus disclosed in Japanese Patent Application Laid-open No. 2005-045308 includes an interface (hereinafter, may be written as "I/F") for connecting to a LAN and an I/F for establishing a wireless connection to a mobile terminal device.

However, the configuration of the image processing apparatus disclosed in Japanese Patent Application Laid-open No. 2005-045308, the I/F for connecting to the LAN and the I/F for wireless connection are connected to the same bus (the same network segment); therefore, there is a problem that it is difficult to establish wireless communication (wireless communication using Wi-Fi, etc.) between another apparatus, such as a mobile terminal device, and the image processing apparatus while blocking communication between the another apparatus and a LAN.

Therefore, there is a need for wireless communication between an apparatus and a system while blocking communication between the apparatus and a network connected to the system.

SUMMARY OF THE INVENTION

It is an object of the present invention to at least partially solve the problems in the conventional technology.

There is provided an information processing system that includes: a first communication unit that is connected to a first network segment; a second communication unit that is connected to a second network segment different from the first network segment, and receives a processing request, which requests to execute predetermined processing, from an apparatus via the second network segment and transmits the received processing request to the first communication unit; and an executing unit that executes the predetermined processing in response to the processing request received by the first communication unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an information processing system, an information processing method, and a computer-readable recording medium according to the present invention is explained in detail below with reference to accompanying drawings. There is described an example where the information processing system according to the present invention is applied to a multifunction peripheral (MFP); however, the information processing system is not limited to this. Incidentally, the MFP is a device having at least two functions out of a print function, a copy function, a scanner function, and a facsimile function.

Figure 1:
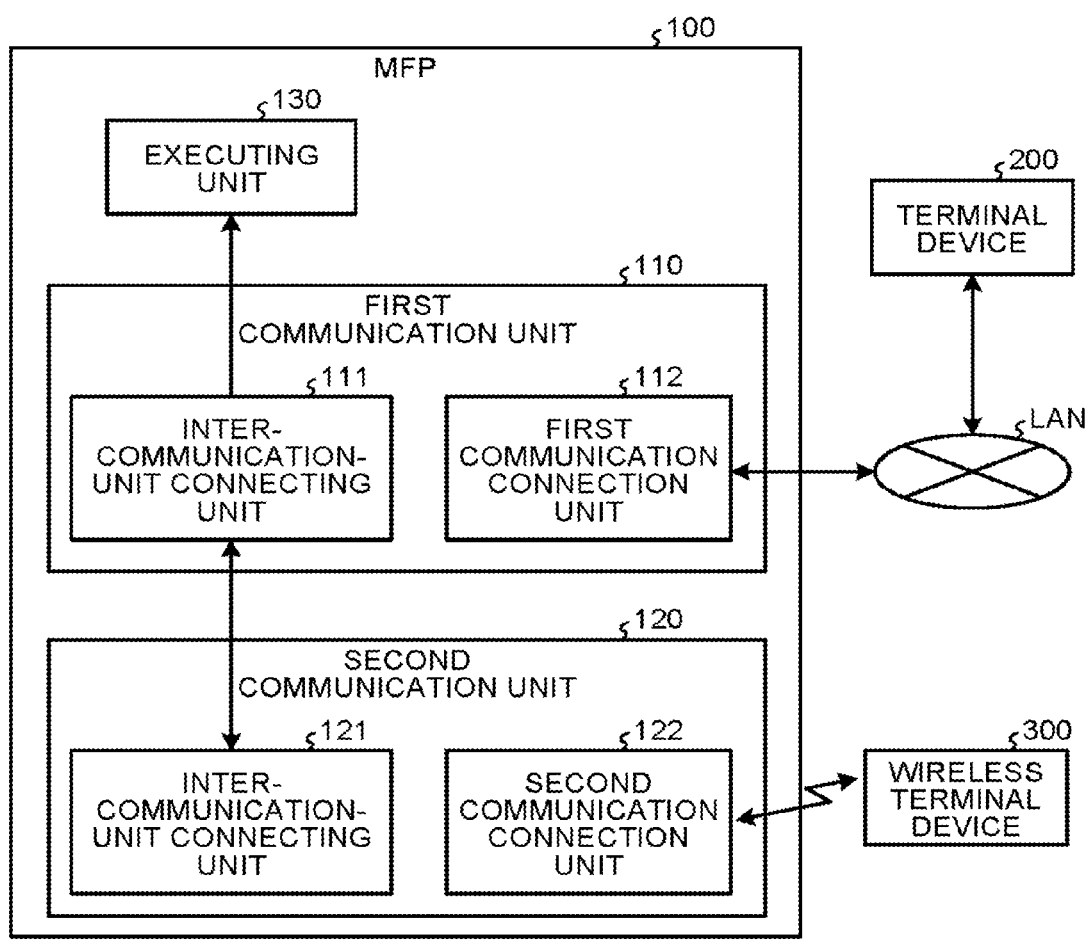
FIG. 1 is a schematic diagram showing a functional configuration of a minimum unit of an MFP to which the present invention has been applied.

FIG. 1 is a schematic diagram showing a functional configuration of a minimum unit of an MFP (an image forming apparatus) 100 to which the present invention has been applied. As shown in FIG. 1, the MFP 100 includes a first communication unit 110, a second communication unit 120, and an executing unit 130. The first communication unit 110 is connected to a first network segment. In the present application, the term "network segment" means a unit of area composing an identical network. For example, in a LAN, a network segment means an area divided by a switching hub or a repeater hub. In an example shown in FIG. 1, the first network segment is a unit of area composing a LAN; however, the first network segment is not limited to this.

Furthermore, as shown in FIG. 1, the first communication unit 110 includes an inter-communication-unit connecting unit 111 and a first communication connection unit 112. The inter-communication-unit connecting unit 111 is a means for connecting to the second communication unit 120. The first communication connection unit 112 is a means for connecting to the first network segment. In the example shown in FIG. 1, the first communication connection unit 112 is connected to a terminal device 200, such as a PC and a company server, via the LAN.

The second communication unit 120 is connected to a second network segment different from the first network segment. In this example, the second network segment is a unit of area where wireless communication using Wi-Fi, etc. is performed; however, the second network segment is not limited to this. A second communication connection unit 122 is connected to a portable wireless terminal device 300 carried by a user via the second network segment. In this example, the wireless terminal device 300 can be considered to correspond to an "apparatus" in claims.

As shown in FIG. 1, the second communication unit 120 includes an inter-communication-unit connecting unit 121 and the second communication connection unit 122. The inter-communication-unit connecting unit 121 is a means for connecting to the first communication unit 110. The second communication connection unit 122 is a means for connecting to the second network segment. In the example shown in FIG. 1, the second communication connection unit 122 is connected to the wireless terminal device 300 via the second network segment.

Although the details will be described later, the second communication unit 120 receives a processing request, which requests to execute predetermined processing, from the wireless terminal device 300 via the second network segment, and transmits the received processing request to first communication unit 110. The executing unit 130 executes the predetermined processing in response to the processing request received by the first communication unit 110.

Figure 2:
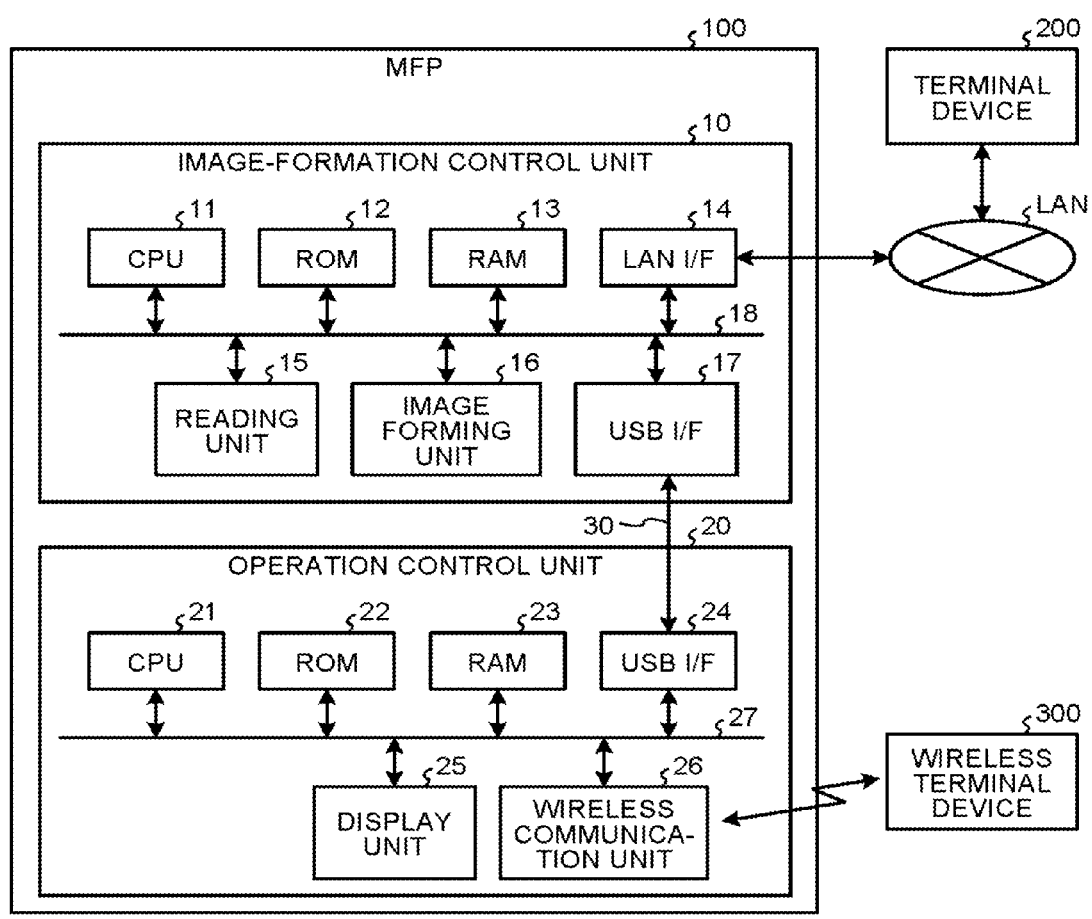
FIG. 2 is a block diagram showing an example of a hardware configuration of the MFP.

Subsequently, a concrete configuration of the MFP 100 is explained with FIG. 2. FIG. 2 is a block diagram showing an example of a hardware configuration of the MFP 100. As shown in FIG. 2, the MFP 100 includes an image-formation control unit 10 and an operation control unit 20. The image-formation control unit 10 can perform print processing and scan processing, etc. The operation control unit 20 receives a processing request (a print request to execute print processing or a scan request to execute scan processing) from the wireless terminal device 300. Here, the image-formation control unit 10 corresponds to the first communication unit 110 shown in FIG. 1, and operation control unit 20 corresponds to the second communication unit 120 shown in FIG. 1. The image-formation control unit 10 and the operation control unit 20 are connected so that they can communicate with each other via a dedicated communication path 30. As the communication path 30, for example, a path based on the USB (Universal Serial Bus) standard can be used; however, the communication path 30 can be any types of paths based on other standards regardless of wired or wireless.

Subsequently, a hardware configuration of the image-formation control unit 10 is explained. As shown in FIG. 2, the image-formation control unit 10 includes a CPU 11, a ROM 12, a RAM 13, a LAN I/F 14, a reading unit 15, an image forming unit 16, and a USB I/F 17, and these are connected to one another via a system bus 18.

The CPU 11 controls the operation of the image-formation control unit 10 overall. The CPU 11 executes a program stored in ROM 12 by using the RAM 13 as a work area, thereby controlling the operation of the entire image-formation control unit 10.

The LAN I/F 14 is an interface for connecting to the first network segment. In this example, the LAN I/F 14 can be considered to correspond to the first communication connection unit 112 shown in FIG. 1.

The reading unit 15 is hardware that performs general information processing and processing other than communication to achieve scan processing (an image reading process) for reading an image from an original. The image forming unit 16 is hardware that performs general information processing and processing other than communication to achieve print processing for forming an image on a recording medium such as a sheet of paper. In this example, the reading unit 15 and the image forming unit 16 can be considered to correspond to the executing unit 130 shown in FIG. 1. Here, the reading unit 15 and the image forming unit 16 are set up in the image-formation control unit 10 corresponding to the first communication unit 110, but the setup is not limited to this; for example, the reading unit 15 and the image forming unit 16 can be set up separately from the image-formation control unit 10 as shown in FIG. 1. In short, the executing unit 130 shown in FIG. 1 can be set up in the first communication unit 110, or can be set up separately from the first communication unit 110.

The USB I/F 17 is an interface for communicating with the operation control unit 20 via the communication path 30. In this example, the USB I/F 17 can be considered to correspond to the inter-communication-unit connecting unit 111 shown in FIG. 1.

Subsequently, a hardware configuration of the operation control unit 20 is explained. As shown in FIG. 2, the operation control unit 20 includes a CPU 21, a ROM 22, a RAM 23, a USB I/F 24, a display unit 25, and a wireless communication unit 26, and these are connected to one another via a system bus 27.

The CPU 21 controls the operation of the operation control unit 20 overall. The CPU 21 executes a program stored in the ROM 22 by using the RAM 23 as a work area, thereby controlling the operation of the entire operation control unit 20.

The USB I/F 24 is an interface for communicating with the image-formation control unit 10 via the communication path 30. The display unit 25 displays a variety of information (for example, information according to a processing request received from the wireless terminal device 300, information indicating the operating state of the MFP 100, and information indicating the setting state, etc.). In this example, the USB I/F 24 can be considered to correspond to the inter-communication-unit connecting unit 121 shown in FIG. 1.

The wireless communication unit 26 is an interface for communicating with the wireless terminal device 300 via second network segment. In this example, the wireless communication unit 26 can be considered to correspond to the second communication connection unit 122 shown in FIG. 1.

In the present embodiment, to maintain the independence of functions, the image-formation control unit 10 and the operation control unit 20 work on different operating systems independently of each other. For example, Linux™ can be used as software of an operating system for running the image-formation control unit 10, and Android' can be used as software of an operating system for running the operation control unit 20. However, the operating systems are not limited to these; for example, the image-formation control unit 10 and the operation control unit 20 can be configured to work on the same operating system.

As described above, present embodiment, the LAN I/F 14 for connecting to a network, such as a corporate LAN, is held in the image-formation control unit 10, and the wireless communication unit 26 for establishing a wireless connection to the wireless terminal device 300 is held in the operation control unit 20, thereby the setting of a default gateway of a network can be performed on each of the image-formation control unit 10 and the operation control unit 20 individually. That is, it is possible to perform communication between the wireless communication unit 26 and the wireless terminal device 300 using Wi-Fi, etc. while blocking communication between the wireless terminal device 300 and a network (a corporate LAN, etc.) connected to the MFP 100.

Furthermore, in the present embodiment, the image-formation control unit 10 and the operation control unit 20 are connected by the communication method based on the USB standard, so communication between the image-formation control unit 10 and the operation control unit 20 can be performed by a method other than network communication (by serial communication, etc.), and therefore, there is no need to perform network settings, such as a static routing.

Subsequently, with FIG. 3, there is explained an example of operation performed when the MFP 100 has received a processing request to execute print processing (in the following description, may be referred to as a "print request") from the wireless terminal device 300 after establishment of communication connection between the wireless terminal device 300 and the MFP 100.

Figure 3:
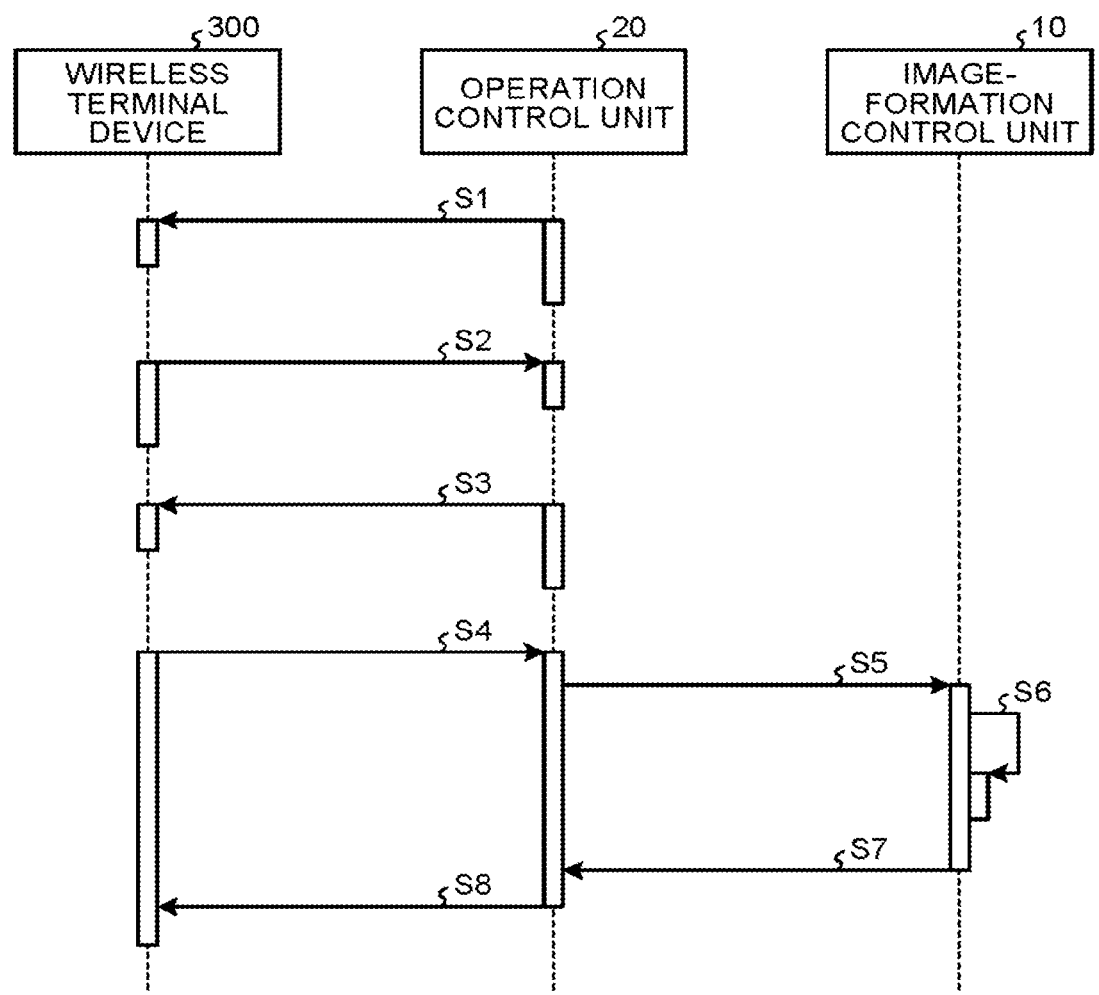
FIG. 3 is a sequence diagram for explaining an example of operation of the MFP.

As shown in FIG. 3, first, the operation control unit 20 transmits a signal including identification information (for example, SSID) for identifying the operation control unit 20 to the wireless terminal device 300 (Step S1). When having received this signal, the wireless terminal device 300 sets up a password and then requests the operation control unit 20 for wireless communication connection (Step S2). Upon receipt of this request, the operation control unit 20 gives a reply of permission for wireless communication connection to the wireless terminal device 300 (Step S3). Accordingly, wireless communication connection between the wireless terminal device 300 and the operation control unit 20 is established. Contents of Steps S1 to S3 are identical to a technique for performing publicly-known wireless communication connection, such as Wi-Fi Direct.

After Step S3, in accordance with an instruction (an operation) from a user, the wireless terminal device 300 transmits a processing request to execute print processing (a print request) to the operation control unit 20 (Step S4). This print request includes a command to execute print processing and image data to be printed (print data), etc. Next, the operation control unit 20 transmits the print request received from the wireless terminal device 300 to the image-formation control unit 10 (Step S5). Then, in response to the print request received from the operation control unit 20, the image-formation control unit 10 (the image forming unit 16) executes print processing (Step S6). Upon completion of the print processing, the image-formation control unit 10 transmits a completion notification, which indicates completion of the print processing, to the operation control unit 20 (Step S7), and the operation control unit 20 transmits the completion notification received from the image-formation control unit 10 to the wireless terminal device 300 (Step S8).

Figure 4:
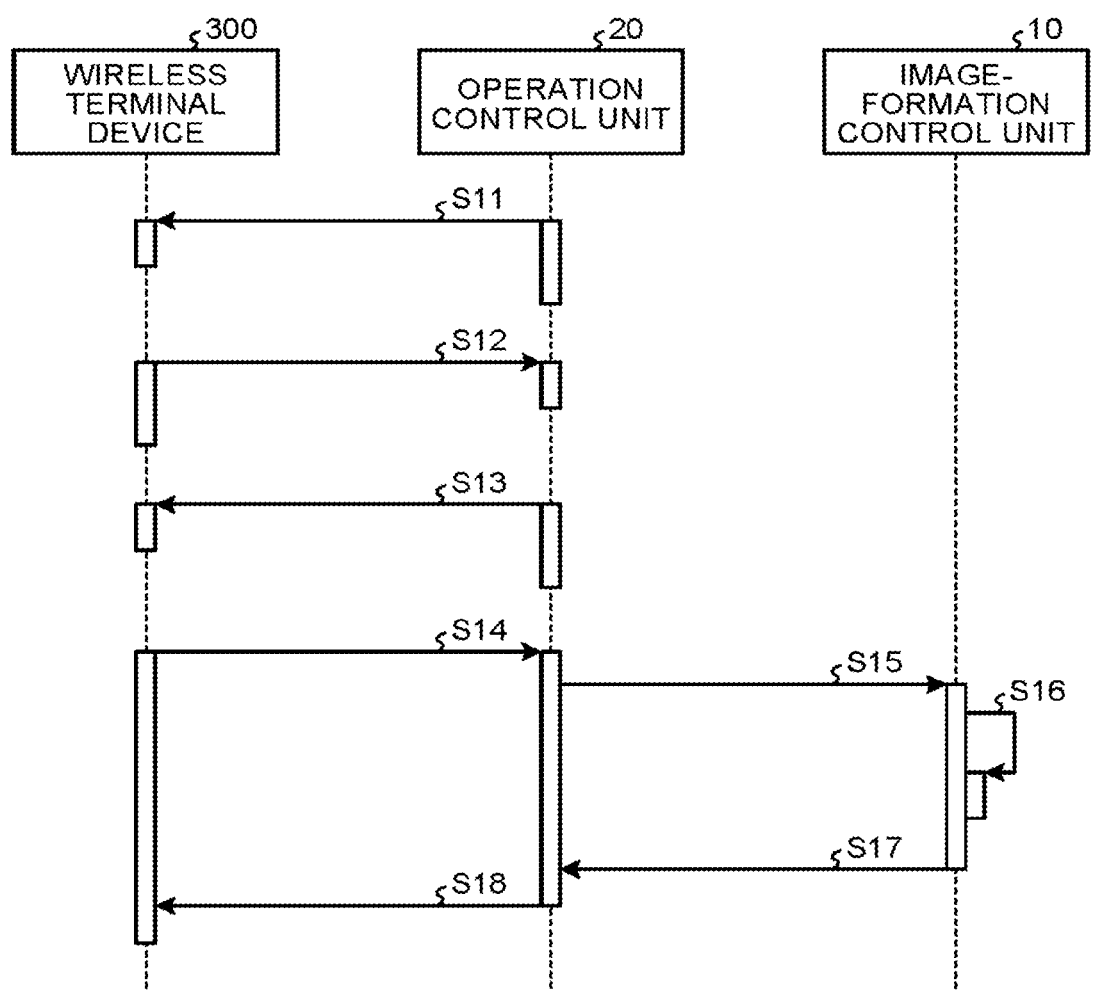
FIG. 4 is a sequence diagram for explaining an example of operation of the MFP.

Subsequently, with FIG. 4, there is explained an example of operation performed when the MFP 100 has received a processing request to execute an image reading process for reading an image from an original (scan processing) (in the following description, may be referred to as a "scan request") from the wireless terminal device 300 after establishment of communication connection between the wireless terminal device 300 and the MFP 100. Contents of processes at Steps S11 to S13 shown in FIG. 4 are identical to those at Steps S1 to S3 shown in FIG. 3, so a detailed description of these steps is omitted.

After Step S13, in accordance with an instruction (an operation) from a user, the wireless terminal device 300 transmits a processing request to execute scan processing (a scan request) to the operation control unit 20 (Step S14). This scan request includes a command to execute scan processing and information indicating settings for the scan processing, etc. Next, the operation control unit 20 transmits the scan request received from the wireless terminal device 300 to the image-formation control unit 10 (Step S15). Then, in response to the scan request received from the operation control unit 20, the image-formation control unit 10 (the reading unit 15) executes scan processing (Step S16). Upon completion of the scan processing, the image-formation control unit 10 transmits image information obtained through the scan processing (image information read from an original) to the operation control unit 20 (Step S17), and the operation control unit 20 transmits the image information received from the image-formation control unit 10 to the wireless terminal device 300 (Step S18).

Incidentally, when the operation control unit 20 has received a processing request (in this example, a print request or a scan request) from the wireless terminal device 300 after establishment of communication connection with the wireless terminal device 300, if the image-formation control unit 10 (in this example, the reading unit 15 or the image forming unit 16) is not in a fit state to execute predetermined processing (in this example, print processing or scan processing) according to the received processing request, the operation control unit 20 can transfer the received processing request to the operation control unit 20 of another MFP 1000 having the same functions as the MFP 100.

As an example of this case, with FIG. 5, there is explained below an example of operation performed when the MEP 100 (the operation control unit 20) has received a print request from the wireless terminal device 300 after establishment of communication connection between the wireless terminal device 300 and the MFP 100. In the following explanation, the image-formation control unit 10 and the operation control unit 20 that the MFP 100 has may be referred to as an "image-formation control unit 10a" and an "operation control unit 20a", and the image-formation control unit 10 and the operation control unit 20 that another MFP 1000 has may be referred to as an "image-formation control unit 10b" and an "operation control unit 20b".

Figure 5:
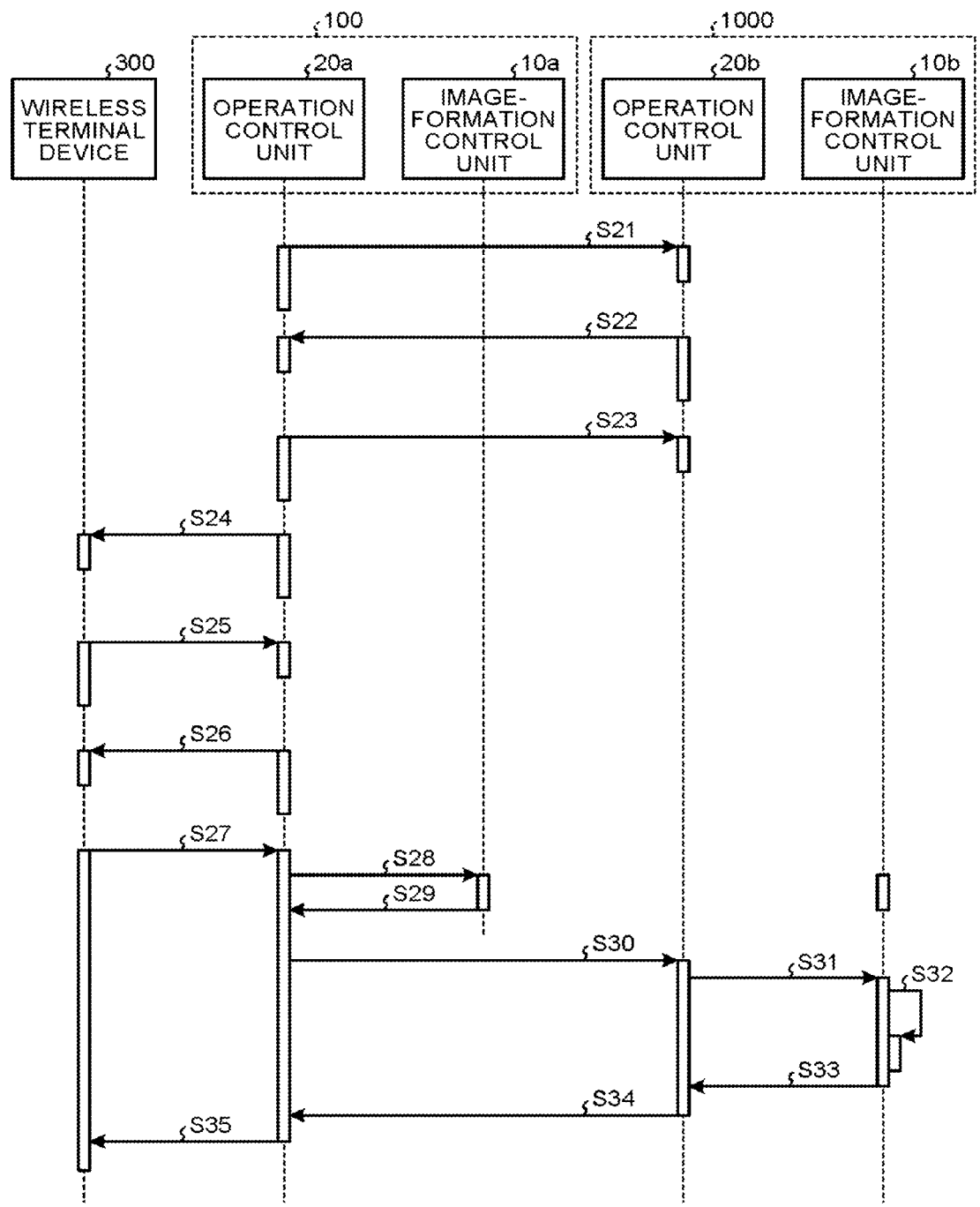
FIG. 5 is a sequence diagram for explaining an example of operation of the MFP.

As shown in FIG. 5, first, the operation control unit 20a of the MFP 100 transmits a signal including identification information (for example, SSID) for identifying the operation control unit 20a to the operation control unit 20b of the MFP 1000 (Step S21). When having received this signal, the operation control unit 20b of the MFP 1000 sets up a password and then requests the operation control unit 20a for communication connection (Step S22). Upon receipt of this request, the operation control unit 20a gives a reply of permission for communication connection to the operation control unit 20b of the MFP 1000 (Step S23). Accordingly, the communication connection between the operation control unit 20a and the operation control unit 20b is established. Contents of Steps S21 to S23 are identical to a technique for performing publicly-known wireless connection, such as Wi-Fi Direct.

Next, the operation control unit 20a transmits a signal including the identification information (for example, SSID) for identifying the operation control unit 20a to the wireless terminal device 300 (Step S24). When having received this signal, the wireless terminal device 300 sets up a password and then requests the operation control unit 20a for communication connection (Step S25). Upon receipt of this request, the operation control unit 20a gives a reply of permission for communication connection to the wireless terminal device 300 (Step S26). Accordingly, the communication connection between the wireless terminal device 300 and the operation control unit 20a is established. Contents of Steps S24 to S26 are identical to a technique for performing publicly-known wireless connection, such as Wi-Fi Direct.

After Step S26, in accordance with an instruction (an operation) from a user, the wireless terminal device 300 transmits a print request to the operation control unit 20a (Step S27). When having received the print request from the wireless terminal device 300, the operation control unit 20a inquires of the image-formation control unit 10a of the MFP 100 whether the image forming unit 16 is in a fit state to execute print processing (Step S28). When having received this inquiry, the image-formation control unit 10a checks the current state of the image forming unit 16, and transmits an answer signal, which indicates whether or not the image forming unit 16 is in a fit state to execute print processing, to the operation control unit 20a (Step S29). For example, when the image forming unit 16 is executing print processing according to another print request, it is difficult to execute print processing according to a new print request; therefore, in this case, an answer signal indicating that the image forming unit 16 is not in a fit state to execute print processing is transmitted to the operation control unit 20a.

When having received the answer signal indicating that the image forming unit 16 is not in a fit state to execute print processing, the operation control unit 20a transmits the print request received from the wireless terminal device 300 at Step S27 to the operation control unit 20b of the MFP 1000 (Step S30). When having received this print request, the operation control unit 20b transmits the received print request to the image-formation control unit 10b of the MFP 1000 (Step S31). For convenience of explanation, the image forming unit 16 of the MFP 1000 shall be in a fit state to execute print processing. Then, the image-formation control unit 10b (the image forming unit 16) executes print processing according to the print request received from the operation control unit 20b (Step S32). Upon completion of the print processing, the image-formation control unit 10b transmits a completion notification, which indicates completion of the print processing, to the operation control unit 20b (Step S33), and the operation control unit 20b transmits the completion notification received from the image-formation control unit 10b to the operation control unit 20a of the MFP 100 (Step S34). When having received this completion notification, the operation control unit 20a transmits the received completion notification to the wireless terminal device 300 (Step S35).

Incidentally, for example, as for an example of operation performed when the MFP 100 has received a scan request from the wireless terminal device 300 after establishment of communication connection between wireless terminal device 300 and the MFP 100, processing can be performed in much the same way as in FIG. 5.

As described above, in the present embodiment, the LAN I/F 14 for connecting to a network, such as a corporate LAN, is held in the image-formation control unit 10, and the wireless communication unit 26 for establishing a wireless connection to the wireless terminal device 300 is held in the operation control unit 20, thereby the setting of a default gateway of a network can be performed on each of the image-formation control unit 10 and the operation control unit 20 individually. That is, it is possible to perform communication between the wireless communication unit 26 and the wireless terminal device 300 using Wi-F etc. while blocking communication between the wireless terminal device 300 and a network (a corporate LAN, etc.) connected to the MFP 100.

Incidentally, in the above-described embodiment, there is described an example where the first communication unit 110 shown in FIG. 1 and the second communication unit 120 shown in FIG. 1 are installed in the same device (in the above-described embodiment, the MFP 100); however, this is not limited to the above-described embodiment, and, for example, the first communication unit 110 and the second communication unit 120 can be installed in different devices.

(Program)

A program executed by the MFP 100 according to the above-described embodiment can be provided in a manner recorded on a computer-readable recording medium, such as a CD-ROM, a flexible disk (FD), a CD-R, a digital versatile disk (DVD), or a universal serial bus (USB) memory, in an installable or executable file format, or can be provided or distributed via a network such as the Internet. Furthermore, various programs can be built into a ROM or like in advance to be provided.

According to the present invention, it is possible to perform wireless communication between an apparatus and a system while blocking communication between the apparatus and a network connected to the system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image formation control device that includes a first central processing unit (CPU), a first connection device configured to connect to a first network segment, and at least one of an image forming device and a reading device; and
   an operation control device that includes a second CPU different from the first CPU, a second connection device configured to wirelessly connect to a second network segment different from the first network segment, and a user interface to receive an operation instruction to the image forming device or the reading device, wherein
   the second CPU of the operation control device, which is part of the image forming apparatus, receives a processing request including a print request or a scan request using the second network segment from a wireless terminal device via the second connection device, and transmits the processing request to the image forming device or the reading device,
   the first CPU of the image formation control device causes the image forming device or the reading device to execute processing according to the processing request, and
   the operation control device, which is part of the image forming apparatus, transmits the processing request to the image forming device or the reading device using the second network segment, without using the first network segment.

2. The image forming apparatus according to claim 1, wherein the image formation control device and the operation control device are associated with different operating systems.

3. The image forming apparatus according to claim 1, wherein the first connection device is a local area network (LAN) interface (I/F) that establishes a wired connection with a network, and the second connection device establishes a wireless connection with the wireless terminal device using Wi-Fi.

4. The image forming apparatus according to claim 1, wherein each of the image formation control device and the operation control device individually performs setting of a default gateway of a network.

5. The image forming apparatus according to claim 1, wherein
the image formation control device and the operation control device each includes a universal serial bus (USB) I/F different from the first connection device and the second connection device, and
the operation control device transmits the processing request to the image forming device or the reading device by serial communication using a USB.

6. The image forming apparatus according to claim 1, wherein the processing request includes a print process.

7. The image forming apparatus according to claim 1, wherein
after establishment of communication connection with the wireless terminal device, the operation control device is configured to receive the processing request, which includes the print request or the scan request, to execute a print process or a scan process from the wireless terminal device and transmit the received processing request to execute the print process or the scan process to the image formation control device or the reading device.

8. The image forming apparatus according to claim 1, wherein
when the operation control device has received the processing request from the wireless terminal device after establishment of communication connection with the wireless terminal device, and when the image formation control device is not in a fit state to execute the processing according to the received processing request, the operation control device is configured to transfer the received processing request to an operation control device of another image forming apparatus.

9. An image forming method for an image forming apparatus that includes an image formation control device that includes a first central processing unit (CPU), a first connection device configured to connect to a first network segment, and at least one of an image forming device and a reading device, and includes an operation control device that includes a second CPU different from the first CPU, a second connection device configured to wirelessly connect to a second network segment different from the first network segment, and a user interface to receive an operation instruction to the image forming device or the reading device, the image forming method comprising:
receiving, by the second CPU of the operation control device, which is part of the image forming apparatus, a processing request including a print request or a scan request using the second network segment from a wireless terminal device via the second connection device, and transmitting the processing request to the image forming device or the reading device;
causing, by the first CPU of the image formation control device, the image forming device or the reading device to execute processing according to the processing request; and
transmitting, by the operation control device, which is part of the image forming apparatus, the processing request to the image forming device or the reading device using the second network segment, without using the first network segment.

10. A non-transitory computer-readable recording medium that stores therein computer executable instructions that, when executed, cause an image forming apparatus to execute an image forming method, the image forming apparatus including an image formation control device that includes a first central processing unit (CPU), a first connection device configured to connect to a first network segment, and at least one of an image forming device and a reading device, and including an operation control device that includes a second CPU different from the first CPU, a second connection device configured to wirelessly connect to a second network segment different from the first network segment, and a user interface to receive an operation instruction to the image forming device or the reading device, the image forming method comprising:
receiving, by the second CPU of the operation control device, which is part of the image forming apparatus, a processing request including a print request or a scan request using the second network segment from a wireless terminal device via the second connection device, and transmitting the processing request to the image forming device or the reading device;
causing, by the first CPU of the image formation control device, the image forming device or the reading device to execute processing according to the processing request; and
transmitting, by the operation control device, which is part of the image forming apparatus, the processing request to the image forming device or the reading device using the second network segment, without using the first network segment.

* * * * *